May 31, 1966 C. S. PHELAN 3,253,630
HIGH SPEED LOCK WASHER
Filed April 14, 1964
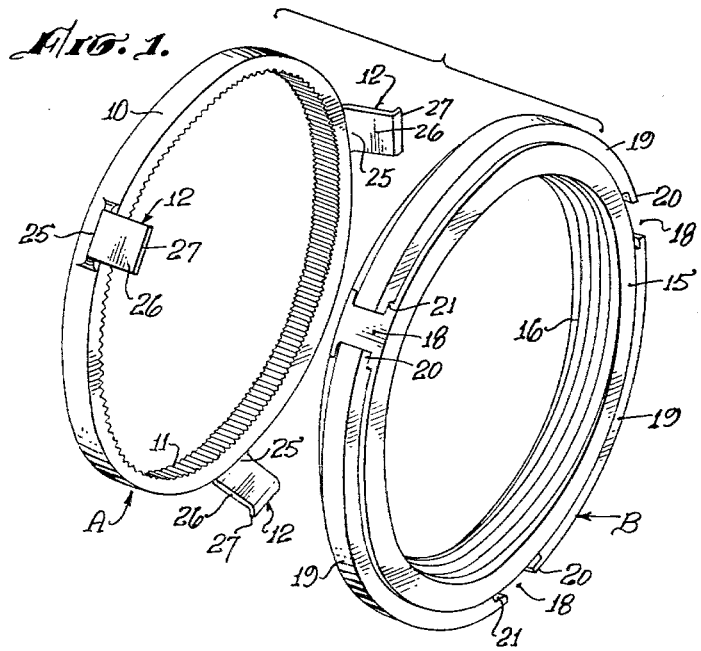
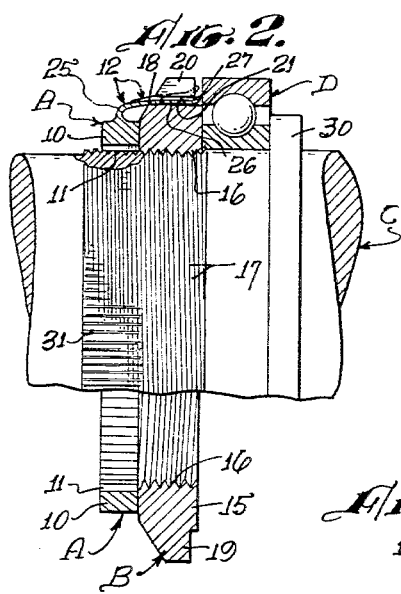
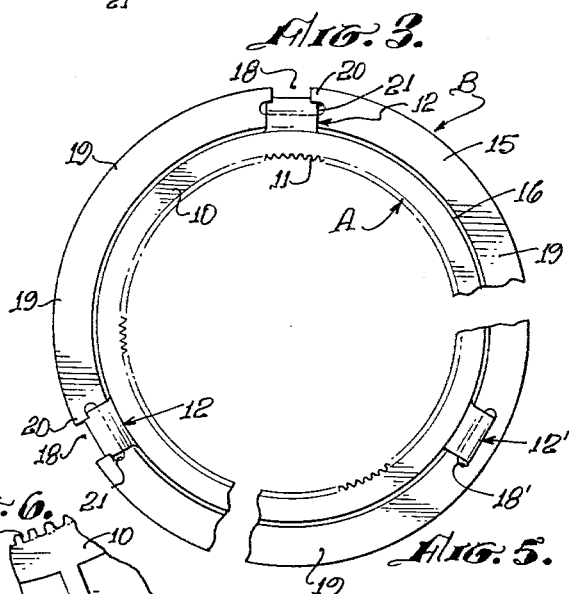
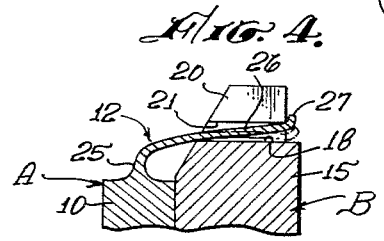
CHARLES S. PHELAN,
INVENTOR.
BY Lynn H Latta
ATTORNEY.

United States Patent Office 3,253,630
Patented May 31, 1966

3,253,630
HIGH SPEED LOCK WASHER
Charles S. Phelan, Tustin, Calif., assignor to Frederick W. Rohe, Placentia, Calif.
Filed Apr. 14, 1964, Ser. No. 359,627
3 Claims. (Cl. 151—29)

This invention relates to lock washers of the type embodying an internally splined collar which is installed on a bolt or other male threaded member by axial sliding of the internal splines into axial serrations in the threads of such male threaded member, and having a plurality of fingers which are engageable in notches in a nut adjacent the washer, for holding the nut against rotation.

The invention aims to provide such a lock washer having the following characteristics:

(1) Rapidity of installation in the coupling of the washer to the nut;
(2) Avoiding the necessity for bending the retainer fingers of the lock washer to secure them in the notches of the nut;
(3) Centrifugal energization of retainer fingers to intensified holding action in high-speed installations;
(4) Utilization of spring action to latch the retainer fingers to the nut;
(5) Rapidity of release of the washer from the nut;
(6) Release responsive to deflection of the retainer fingers against their spring-loading; and
(7) Relative simplicity of construction and operation of the lock washer.

Other objects and advantages will become apparent in the ensuing specification and appended drawing in which:

FIG. 1 is an exploded perspective view of a paired arrangement of nut and lock washer embodying my invention;

FIG. 2 is an axial sectional view of the same installed on a threaded shaft member which is shown partially in section and largely in elevation;

FIG. 3 is an end view of the assembly of lock washer and nut;

FIG. 4 is a fragmentary sectional view of the washer-to-nut coupling means, illustrating in phantom the release operation;

FIG. 5 is a fragmentary end view of a modified form; and

FIG. 6 is a fragmentary end view of another modification.

Referring now to the drawing in detail, I have shown therein, as an example of one form in which the invention may be embodied, a combination of lock washer A and bearing retainer nut B adapted for installation on a male threaded member shown by way of example as a shaft C, for securing a ball bearing unit D thereon. It is to be understood that the same combination of lock washer and nut can be utilized in bolt and nut fasteners and the like. Other applications of the invention will suggest themselves to those skilled in allied or related arts.

In detail, the washer A comprises a collar portion 10 having internal splines 11 defining a generally cylindrical internal wall and having integral retainer fingers 12 projecting axially from its periphery.

The nut B comprises an annular body 15 having internal threads 16 for mating with male threads 17 on the shaft C, and having axially extending apertures 18 in a peripheral portion thereof. In the specific form herein disclosed, the apertures consist of T-slots defined between a plurality of segments 19 having their circumferential extremities formed as keeper fingers 20 which overhang the lateral notch portions 21 of the T-slots 18. The T-slots 18 extend axially and are of uniform width through their axial extent. At their major circumferential width, as defined by the opposed under-cut notches 21 thereof, the T-slots are slightly wider than the retainer fingers 12 which are received therein. The T-slots may be finish-machined by a broaching operation, as are the splines 11 also.

Referring now to FIG. 4, the fingers 12 include radially outwardly extending neck portions 25 which may be integrally joined to the periphery of the splined collar 10 as indicated, or may be formed separately and welded to the periphery of the collar 10 to provide the integral relationship. The fingers 12 also include flexible arm portions 26 extending axially from the neck portions 25, the latter functioning to offset the arm portions 26 radially outwardly from the periphery of collar 10. The free ends of arm portions 26 are formed with outwardly hooked latching tips 27 which are inclined outwardly at an obtuse dihedral angle with reference to the adjoining arm portions 26 and are engageable against the end extremities of overhanging fingers 20 of nut B with a camming or wedging action (in response to the outward spring-loading in the flexible arm portions 26). This wedging action is effective to draw the collar 10 snugly against the forward end face of the nut body 15, resisting any tendency of vibration to loosen the lock washer from the nut.

The latching fingers 12 are resilient and when unstressed they will assume positions of greater outward flare than their positions of coupling engagement with the nut B as shown in full lines in FIGS. 2 and 4. Such unstressed position is approximately as indicated in phantom in FIG. 2. This provides for spring-loading fingers 12 outwardly against the overhanging keeper fingers 20 of nut B to maintain the coupled relation resisting any tendency of vibration to release it.

In the particular application of the invention shown in FIG. 2, the nut 15 has been tightened against the inner race of a ball bearing D to securely clamp the same against an integral abutment shoulder or flange 30 on the shaft C. The splines 11 of the lock washer A are engaged in axial serrations 31 in the male threaded member C so as to securely lock the washer A against rotation.

In the installation of the parts of this assembly, after the bearing D has been installed over the shaft C, the nut 15 is threaded onto the threaded portion 17 of the shaft and cinched against the bearing, and the washer 10 is then fitted over the shaft, its retainer fingers 12 are aligned with the T-slots 18, its splines 11 are then aligned with the serrations 31 of shaft C in a fine adjustment, the fingers 12 are then flexed inwardly (e.g. by finger pressure) until their latching tips 27 enter the T-slots 18, and the lock washer A is then pressed home, the latching tips 27 riding against the inner faces of fingers 20 until they emerge through the back ends of the T-slots, when they will snap outwardly into latching engagement with the rear ends of the fingers 20.

To release the coupling engagement between the lock washer and the nut, the fingers 12 are again pressed inwardly until the latching tips 27 clear the keeper fingers 20 of the nut, and the washer is then withdrawn axially from the threaded portions 17 of the shaft, permitting the nut 15 to be rotated so as to back it off from the bearing D.

The application of inward pressure to the fingers 12 to release their latching engagement with the nut, may be facilitated by insertion of the jaws of a suitable compressor tool through the peripheral openings of the T-slots 18.

The invention is especially advantageous in installations where high speeds of revolution of the interlocked parts are attained. As rotary speed of the assembly increases, the retainer fingers 12 will be energized by correspondingly increasing centrifugal loading directed radially outwardly, which will intensify their locking grip against the overhanging fingers 20.

Apertures 18, instead of being T slots as illustrated, may be in the form of closed apertures 18' as in FIG. 5. Apertures 18 (or 18') and fingers 12 may be of flat, circumferentially elongated cross-section as shown in FIGS. 1–5, or may be of circular cross section (e.g. finger 12'' fabricated of spring-wire and engageable in bore aperture 18'' as in FIG. 6).

The circumferential width of slots 18 (or 18') is greater than that of fingers 12 by an amount at least equal to the spacing between the centers of adjacent splines 11, so as to provide for the fine adjustment for coupling the splines 11 to shaft splines 17, as described above.

I claim:

1. A nut and lock washer assembly comprising: a nut having internal threads for mating engagement with external threads of a male member and having in its periphery a plurality of circumferentially spaced latch apertures and keeper means extending circumferentially over said apertures; and a lock washer comprising a collar having a substantially continuous circumferential array of axially extending internal splines for mating with serrations in said male threads, said lock washer further including a plurality of retainer fingers projecting axially therefrom in positions for reception in said latch apertures and having at their free ends, outwardly hooked latching tips engageable against the rear ends of said keeper means with said retainer fingers projecting axially through said latch apertures to latch the lock washer to the nut, said retainer fingers being resilient and having unstressed positions disposed radially outwardly of their coupled positions engaged beneath said keeper means whereby said fingers, in said coupled positions, will exert outward spring-loading against said keeper means to maintain their latching engagement therewith, the circumferential width of said apertures being greater than the width of the retainer fingers by an amount at least equal to the spacing between the centers of adjacent splines.

2. A nut and lock washer combination as defined in claim 1, wherein said retainer fingers include neck portions joining them to the periphery of said lock washer collar, said neck portions projecting radially outwardly from said periphery so as to offset said retainer fingers radially outwardly therefrom.

3. A nut and lock washer assembly as defined in claim 1; said nut having on its periphery a plurality of circumferentially spaced segments the circumferential extremities of which are provided with opposed, circumferentially spaced keeper fingers projecting circumferentially and spaced radially outwardly from the body of the nut so that the opposed pairs of fingers define said latch apertures in the form of T-slots extending axially.

References Cited by the Examiner

UNITED STATES PATENTS

| 478,096 | 7/1892 | Durben | 151—8 |
| 633,606 | 9/1899 | Newcomb | 151—29 |
| 906,476 | 12/1908 | Ullmann | 151—29 |
| 1,177,780 | 4/1916 | Kessel | 151—8 |
| 1,595,026 | 8/1926 | Sherman | 151—28 |
| 2,694,430 | 11/1954 | Andershock | 151—21 |

EDWARD C. ALLEN, *Primary Examiner.*